United States Patent [19]

Simm et al.

[11] Patent Number: 4,594,103

[45] Date of Patent: Jun. 10, 1986

[54] POWDERED NICKEL-CHROMIUM BASED MATERIAL FOR THERMAL SPRAYING

[75] Inventors: Wolfgang Simm, Ecublens; Hans-Theo Steine, Chavannes, both of Switzerland

[73] Assignee: Castolin S.A., Saint-Sulpice, Switzerland

[21] Appl. No.: 713,402

[22] PCT Filed: Jun. 20, 1984

[86] PCT No.: PCT/CH84/00101

§ 371 Date: Feb. 21, 1985

§ 102(e) Date: Feb. 21, 1985

[87] PCT Pub. No.: WO85/00127

PCT Pub. Date: Jan. 17, 1985

[30] Foreign Application Priority Data

Jun. 28, 1983 [CH] Switzerland .................... 3532/83

[51] Int. Cl.$^4$ .............................................. C22C 38/40
[52] U.S. Cl. .................... 75/128 C; 75/128 R; 75/128 D; 75/128 F; 75/128 W; 420/428; 420/452; 420/453
[58] Field of Search ............. 75/126 R, 126 A, 126 C, 75/126 F, 126 P, 126 Q, 128 R, 128 C, 128 D, 128 F, 128 G, 128 W; 420/452, 453, 428

[56] References Cited

U.S. PATENT DOCUMENTS

| 3,865,581 | 2/1975 | Sekino et al. | 420/452 |
| 4,227,925 | 10/1980 | Hosoi et al. | 420/453 |
| 4,425,300 | 1/1984 | Teramoto et al. | 420/453 |

*Primary Examiner*—Stephen J. Lechert, Jr.
*Attorney, Agent, or Firm*—Hopgood, Calimafde, Kalil, Blaustein & Judlowe

[57] ABSTRACT

The material according to the present invention comprises a self-flowing alloy containing particularly from 18 to 35% by weight of chromium as well as fractions of boron and silicon in a ratio of 3:4. The alloy also contains from 0.1 to 25.0% by weight of iron, except for the range from 1.5 to 6. The layers obtained by means of said material exhibit a very high resistance to temperatures, particularly also to corrosion and oxidation.

11 Claims, No Drawings

POWDERED NICKEL-CHROMIUM BASED MATERIAL FOR THERMAL SPRAYING

The invention relates to a powdered material comprising a self-fluxing nickel-chromium based alloy for producing, by thermal spraying and fusing, protective coatings resistant to erosion, corrosion and oxidation.

The usual spraying materials of this kind presently on the market comprise nickel-chromium based alloys having chromium contents between 0.5 and 17.0 percent by weight. The field of use of such hard alloy materials is the production of strongly wear resistant protective coatings to be exposed to corrosion and oxidation.

It appeared, however, that the oxidation resistance of those protective coatings is tolerably satisfactory only up to temperatures of at maximum 600°–700° C. and that furthermore, under additional corrosive attack by hot gases, the life of the coatings diminishes very quickly already in the range above 400° C. and does not meet the requirements of the present time.

It is an object of the invention to improve the heat-resistance of coatings produced from the material mentioned at the beginning and to obtain simultaneously very good resistance to erosion and/or corrosion and/or oxidation.

It has been established, surprisingly, that under specific conditions a substantial improvement of the heat-resistance can be reached by increasing the chromium content of the alloy beyond the usual limits. This is the more unexpected as one knows from experience that the mechanical properties, in particular the hardness of the coating layer, are no more notably influenced by such an increase. The invention, however, provides the knowledge, that when properly choosing the amounts of various alloying elements with respect to each other, the diffusion of chromium towards the surface of the coating produced can be improved and thus the heat resistance of the coating can be raised up to 900° C.

The spraying material according to the invention is characterized in that the alloy comprised therein has the following composition, in percent by weight

| C | 0.01–2.0 | |
|---|---|---|
| Fe | 0.1–25.0 | except the range of 1.5–6 |
| B | 0.5–4.5 | |
| Si | 0.6–5.5 | |
| Cr | 18.0–35.0 | |
| Ni | remainder, | | the boron content being equal to 75 percent of the respective silicon content, with a maximum deviation of ±10 percent.

In the present alloy, the indicated relationship between the amounts of boron and silicon is essential. Other elements having an influence on the rapidity of diffusion of chromium in a protective layer produced from such an alloy are carbon, niobium, iron and molybdenum. Regarding the iron content of the alloy, in particular, the two partial ranges of 0.1 to 1.5 and of 6 to 25 percent by weight are being taken into consideration. For the carbon content also a lower and a higher partial range appear to be particularly advantageous.

Claims 2–11 accordingly indicate preferred compositions of the spraying material of the invention.

It can be noted from these compositions that more particularly for an iron content of more than 6 percent the molybdenum content should be in the lower range, i.e. below 7 percent. On the other hand, should a high content of molybdenum be desired, the iron content should be low, namely less than 1.5 percent.

In the following Table several examples of alloy compositions for the spraying material according to the invention are indicated, together with, in each case, the corresponding temperature of the heat-resistance $T_{Dmax}$ in continuous working. The compositions are given in percent by weight.

TABLE

| COMPOSITION | ALLOY | | | | | | |
|---|---|---|---|---|---|---|---|
| | 1 | 2 | 3 | 4 | 5 | 6 | 7 |
| C | 0.2 | 0.5 | 0.2 | 1 | 0.2 | 1.5 | 0.5 |
| Fe | 0.5 | 1 | 7 | 1.2 | 1 | 1.5 | 9 |
| B | 3.2 | 3 | 1.8 | 2.1 | 3.1 | 2.7 | 2.1 |
| Si | 4.1 | 4 | 2.5 | 2.9 | 4 | 3.2 | 2.9 |
| Cr | 20 | 24 | 26 | 30 | 34 | 19 | 25 |
| Mo | — | — | 4 | 10 | — | 13 | 2 |
| Nb | — | 0.2 | — | 0.1 | 0.3 | — | 0.1 |
| $T_{Dmax}$ | 750°–800° | 750°–800° | 800°–850° | 800°–850° | 850°–900° | 850°–900° | 800°–850° |

The choice of a specific alloy composition is further made within the indicated ranges depending on the desired hardness and on the kind of corrosion which applies.

We claim:

1. A powdered spraying material for producing, by thermal spraying and fusing, protective coatings resistant to erosion, corrosion and oxidation, said material comprising a self-fluxing nickel-chromium-based alloy, characterized in that the alloy has the following composition, in percent by weight:

| C | 0.01–2.0 | |
|---|---|---|
| Fe | 0.1–25.0 | except the range of 1.5–6 |
| B | 0.5–4.5 | |
| Si | 0.6–5.5 | |
| Cr | 18.0–35.0 | |
| Ni | remainder, | | the boron content being equal to 75 percent of the respective silicon content, with a maximum deviation of ±10 percent.

2. A spraying material as claimed in claim 1, characterized in that the alloy further contains, in percent by weight, up to 2.0 of niobium and/or up to 15.0 of molybdenum.

3. A spraying material as claimed in claim 1 or 2, characterized in that the silicon content is comprised between 1.8 and 4.5 percent by weight.

4. A spraying material as claimed in one of the claims 1, 2 or 3, characterized in that the chromium content is comprised between 20.0 and 28.0 percent by weight.

5. A spraying material as claimed in one of the claims 1, 2, 3, or 4, characterized in that the iron content is comprised between 6.0 and 20.0 percent by weight.

6. A spraying material as claimed in one of the claims 1, 2, 3, or 4, characterized in that the iron content is comprised between 0.5 and 1.5 percent by weight.

7. A spraying material as claimed in claim 5, characterized in that the molybdenum content is comprised between 0.5 and 7.0 percent by weight.

8. A spraying material as claimed in claim 6, characterized in that the molybdenum content is comprised between 9.0 and 14.0 percent by weight.

9. A spraying material as claimed in any of the preceding claims, characterized in that the carbon content is comprised between 0.01 and 0.3 percent by weight.

10. A spraying material as claimed in any of claims 1 to 8 characterized in that the carbon content is comprised between 0.5 and 1.5 percent by weight.

11. A spraying material as claimed in claim 10, characterized in that the niobium content is comprised between 0.1 and 1.0 percent by weight.

* * * * *